US012573752B2

(12) United States Patent
Thai et al.

(10) Patent No.: US 12,573,752 B2

(45) Date of Patent: Mar. 10, 2026

(54) ARRAY LATTICE TECHNIQUES FOR HIGH SYMMETRY AND HIGH SCAN PERFORMANCE

(71) Applicant: Qorvo Texas, LLC, Richardson, TX (US)

(72) Inventors: Trang Thai, San Diego, CA (US); Jason Leo Durbin, San Diego, CA (US)

(73) Assignee: Qorvo Texas, LLC, Richardson, TX (US)

( * ) Notice: Subject to any disclaimer, the term of this patent is extended or adjusted under 35 U.S.C. 154(b) by 0 days.

(21) Appl. No.: 18/601,689

(22) Filed: Mar. 11, 2024

(65) Prior Publication Data

US 2024/0364006 A1 Oct. 31, 2024

Related U.S. Application Data

(63) Continuation of application No. 17/716,625, filed on Apr. 8, 2022, now Pat. No. 11,955,722.

(60) Provisional application No. 63/173,120, filed on Apr. 9, 2021.

(51) Int. Cl.
*H01Q 3/36* (2006.01)
*H01Q 9/04* (2006.01)

(52) U.S. Cl.
CPC ............... *H01Q 3/36* (2013.01); *H01Q 9/045* (2013.01); *H01Q 9/0478* (2013.01)

(58) Field of Classification Search
CPC .......... H01Q 21/00; H01Q 3/36; H01Q 9/045; H01Q 9/0478
See application file for complete search history.

(56) References Cited

U.S. PATENT DOCUMENTS

| | | | | |
|---|---|---|---|---|
| 4,970,521 | A * | 11/1990 | Lee | H01Q 3/36 343/703 |
| 9,407,005 | B2 * | 8/2016 | Howard | H01Q 21/065 |
| 10,200,098 | B2 * | 2/2019 | McMorrow | H04B 7/1851 |
| 10,355,370 | B2 * | 7/2019 | McMorrow | H01Q 21/245 |
| 11,502,419 | B1 * | 11/2022 | Thai | H01Q 9/0414 |
| 11,532,884 | B1 * | 12/2022 | Coutts | H01Q 1/243 |
| 11,955,722 | B1 * | 4/2024 | Thai | H01Q 9/045 |
| 2004/0095277 | A1 * | 5/2004 | Mohamadi | H01Q 21/065 343/895 |
| 2013/0072125 | A1 * | 3/2013 | Yoon | H01P 1/10 455/67.11 |
| 2013/0249751 | A1 * | 9/2013 | Legare | H01Q 21/061 343/745 |
| 2014/0210668 | A1 * | 7/2014 | Wang | H01Q 3/34 342/372 |
| 2015/0263424 | A1 * | 9/2015 | Sanford | H01Q 3/36 342/371 |

(Continued)

FOREIGN PATENT DOCUMENTS

WO WO-2019173622 A1 * 9/2019 .......... H01Q 21/065

*Primary Examiner* — Dameon E Levi
*Assistant Examiner* — Jordan E. DeWitt
(74) *Attorney, Agent, or Firm* — Haynes and Boone, LLP

(57) ABSTRACT

A phased array system has a substrate, a plurality of elements, a beamforming IC, and a plurality of feedlines electrically coupling the plurality of elements with at least one beamforming IC. In preferred embodiments, the feedlines are non-intersecting, symmetric feedlines that mitigate cross-polarization.

18 Claims, 8 Drawing Sheets
(4 of 8 Drawing Sheet(s) Filed in Color)

(56) References Cited

U.S. PATENT DOCUMENTS

| | | | | |
|---|---|---|---|---|
| 2016/0336344 | A1* | 11/2016 | Mason | H10D 30/6744 |
| 2017/0085006 | A1* | 3/2017 | Corman | H01Q 21/24 |
| 2017/0237180 | A1* | 8/2017 | Corman | H01Q 1/245 343/824 |
| 2017/0310017 | A1* | 10/2017 | Howard | H01Q 21/0006 |
| 2017/0353338 | A1* | 12/2017 | Amadjikpe | H01Q 21/245 |
| 2018/0019517 | A1* | 1/2018 | Allen | H01Q 3/2694 |
| 2018/0287589 | A1* | 10/2018 | Madsen | H03H 11/245 |
| 2019/0044251 | A1* | 2/2019 | McMorrow | H01Q 3/34 |
| 2019/0109101 | A1* | 4/2019 | Menon | H01L 23/552 |
| 2019/0109364 | A1* | 4/2019 | Menon | H01Q 1/02 |
| 2019/0115664 | A1* | 4/2019 | Veihl | H01Q 5/50 |
| 2019/0132035 | A1* | 5/2019 | McMorrow | H04B 7/0617 |
| 2019/0274055 | A1* | 9/2019 | Brechko | H04B 7/10 |
| 2019/0356057 | A1* | 11/2019 | Carey | H01Q 1/241 |
| 2020/0287298 | A1* | 9/2020 | Ueda | H01Q 9/0407 |
| 2020/0294942 | A1* | 9/2020 | Menon | H01Q 1/40 |
| 2020/0303833 | A1* | 9/2020 | Ueda | H01Q 1/2283 |
| 2021/0043996 | A1* | 2/2021 | Menon | H01Q 21/065 |
| 2021/0044017 | A1* | 2/2021 | Greene | H01Q 23/00 |
| 2021/0151876 | A1* | 5/2021 | Farsi | H01Q 3/267 |
| 2021/0296784 | A1* | 9/2021 | Carey | H01Q 1/241 |
| 2021/0320427 | A1* | 10/2021 | Corman | H04L 5/1469 |
| 2022/0285837 | A1* | 9/2022 | Greene | H01Q 23/00 |

* cited by examiner

ARRAY LATTICE TECHNIQUES FOR HIGH SYMMETRY AND HIGH SCAN PERFORMANCE

CROSS-REFERENCE TO RELATED APPLICATION(S)

This patent application is a continuation of U.S. patent application Ser. No. 17/716,625 entitled ARRAY LATTICE TECHNIQUES FOR HIGH SYMMETRY AND HIGH SCAN PERFORMANCE filed Apr. 8, 2022, which claims the benefit of U.S. Provisional Patent Application No. 63/173,120 entitled ARRAY LATTICE TECHNIQUES FOR HIGH SYMMETRY AND HIGH SCAN PERFORMANCE filed Apr. 9, 2021, which is hereby incorporated herein by reference in its entirety.

FIELD OF THE INVENTION

Illustrative embodiments generally relate to phased array systems and, more particularly, various embodiments relate to layout of certain phased array systems.

BACKGROUND OF THE INVENTION

Antennas that emit electronically steered beams are known in the art as "phased array antennas." Such antennas are used worldwide in a wide variety of commercial applications. They typically are produced from many small radiating elements that are individually phase controlled to form a beam in the far field of the antenna. Among other things, phased array antennas are popular due to their ability to rapidly steer beams without requiring moving parts.

SUMMARY OF VARIOUS EMBODIMENTS

In accordance with one embodiment of the invention, a phased array system has a substrate, a plurality of elements, a plurality of beamforming ICs, and a plurality of feedlines electrically coupling the plurality of elements with at least one beamforming IC. In preferred embodiments, the feedlines are non-intersecting, symmetric feedlines that mitigate cross-polarization.

The feedlines to the at least one beamforming IC each also may have substantially the same lengths. Moreover, among other ways, the elements may be configured as a triangular lattice or a rectangular lattice. In some embodiments, the beamforming IC has a first set of element interfaces and a second set of element interfaces. The first set of element interfaces may be configured to be polarized in a first polarization, while the second set of element interfaces may be configured to be polarized in a second polarization. To minimize cross-interference, the first polarization preferably is different from the second polarization (e.g., orthogonal).

As an example, the first element may have first and second locations for receiving two feedlines, and a second element has third and fourth locations for receiving two feedlines. The first and third locations may be configured to be at a first polarization (e.g., a horizontal polarization), while the second and fourth location may be configured to be at a different polarization (e.g., a vertical polarization). The first, second, third, and fourth locations preferably are colinear.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Figure 1:
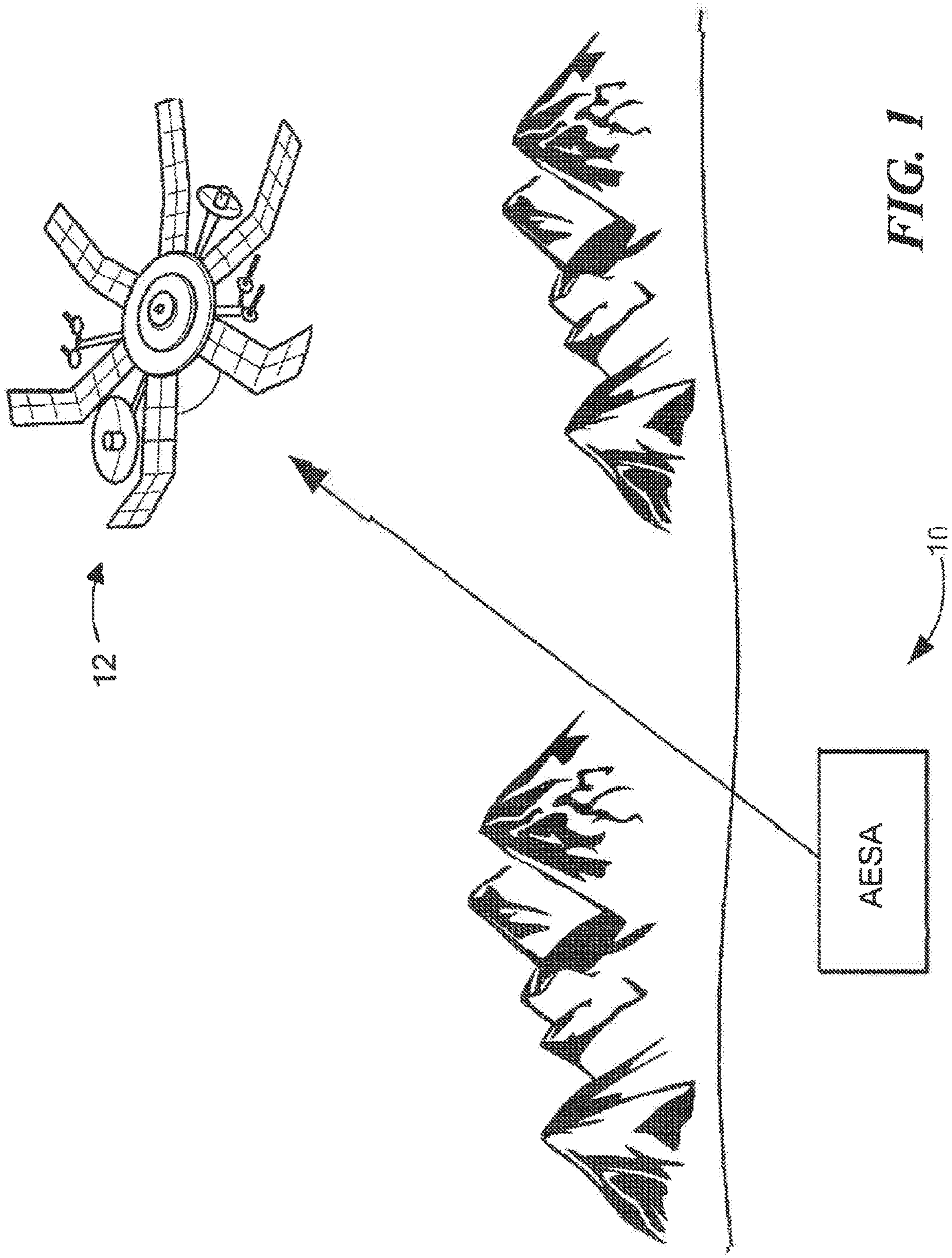
FIG. 1 schematically shows an active electronically steered element system ("AESA system") configured in accordance with illustrative embodiments and communicating with a satellite.

FIG. 1 schematically shows an active electronically steered antenna system ("AESA system 10") configured in accordance with illustrative embodiments of the invention and communicating with an orbiting satellite 12. A phased array (discussed below and identified by reference number "10A") implements the primary functionality of the AESA system 10. Specifically, as known by those skilled in the art, the phased array forms one or more of a plurality of electronically steerable beams that can be used for a wide variety of applications. As a satellite communication system, for example, the AESA system 10 preferably is configured to operate at one or more satellite frequencies. Among others, those frequencies may include the Ka-band, Ku-band, and/or X-band.

The satellite communication system may be part of a cellular network operating under a known cellular protocol, such as the 3G, 4G, or 5G protocols. Accordingly, in addition to communicating with satellites, the system may communicate with earth-bound devices, such as smartphones or other mobile devices, using any of the 3G, 4G, or 5G protocols. As another example, the satellite communication system may transmit/receive information between aircraft and air traffic control systems. Of course, those skilled in the art may use the AESA system 10 (implementing the noted phased array 10A) in a wide variety of other applications, such as broadcasting, optics, radar, etc. Some embodiments may be configured for non-satellite communications and instead communicate with other devices, such as smartphones (e.g., using 4G or 5G protocols). Accordingly, discussion of communication with orbiting satellites 12 is not intended to limit all embodiments of the invention.

Figure 2A:
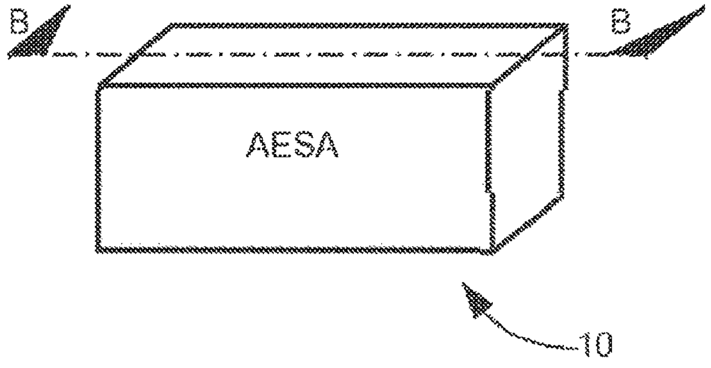
FIGS. 2A and 2B schematically show generalized diagrams of an AESA system that may be configured in accordance with illustrative embodiments.
Figure 2B:
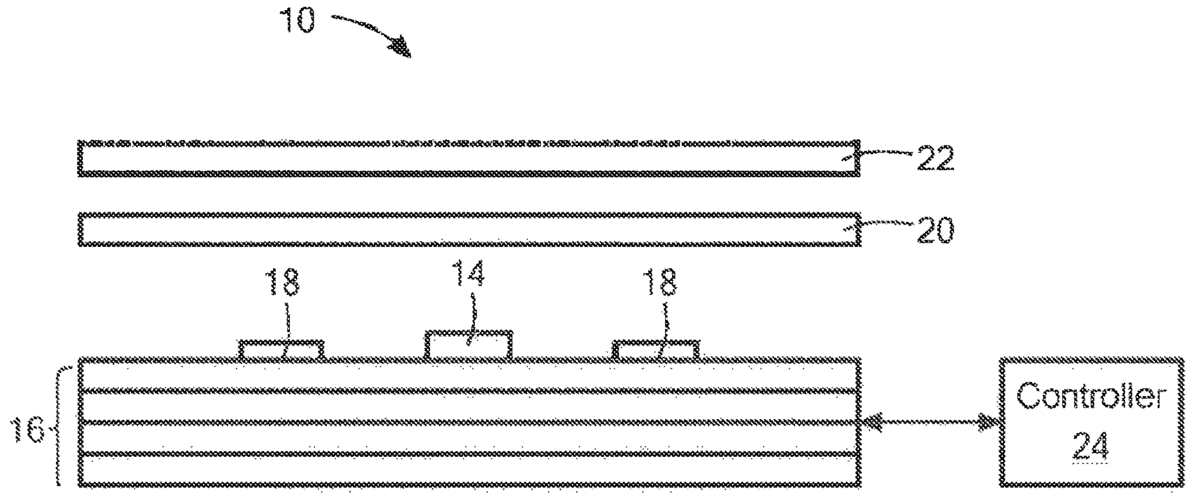

FIGS. 2A and 2B schematically show generalized diagrams of the AESA system 10 configured in accordance with illustrative embodiments of the invention. Specifically, FIG. 2A schematically shows a block diagram of the AESA system 10, while FIG. 2B schematically shows a cross-sectional view of a small portion of the same AESA system 10 across line B-B. This latter view shows a single silicon integrated circuit 14 mounted onto a substrate 16 between two transmit, receive, and/or dual transmit/receive elements 18, i.e., on the same side of a supporting substrate 16 and juxtaposed with the two elements 18. Note that in some embodiments, such as some implementing cellular communications, the integrated circuit 14 can be coupled with four elements 18. In alternative embodiments, however, the integrated circuit 14 could be on the other side/surface of the substrate 16A. The AESA system 10 also has a radome 22 to environmentally protect the phased array of the system 10. A separate antenna controller 24 (FIG. 2B) electrically connects with the phased array to calculate beam steering vectors for the overall phased array, and to provide other control functions.

Figure 3A:
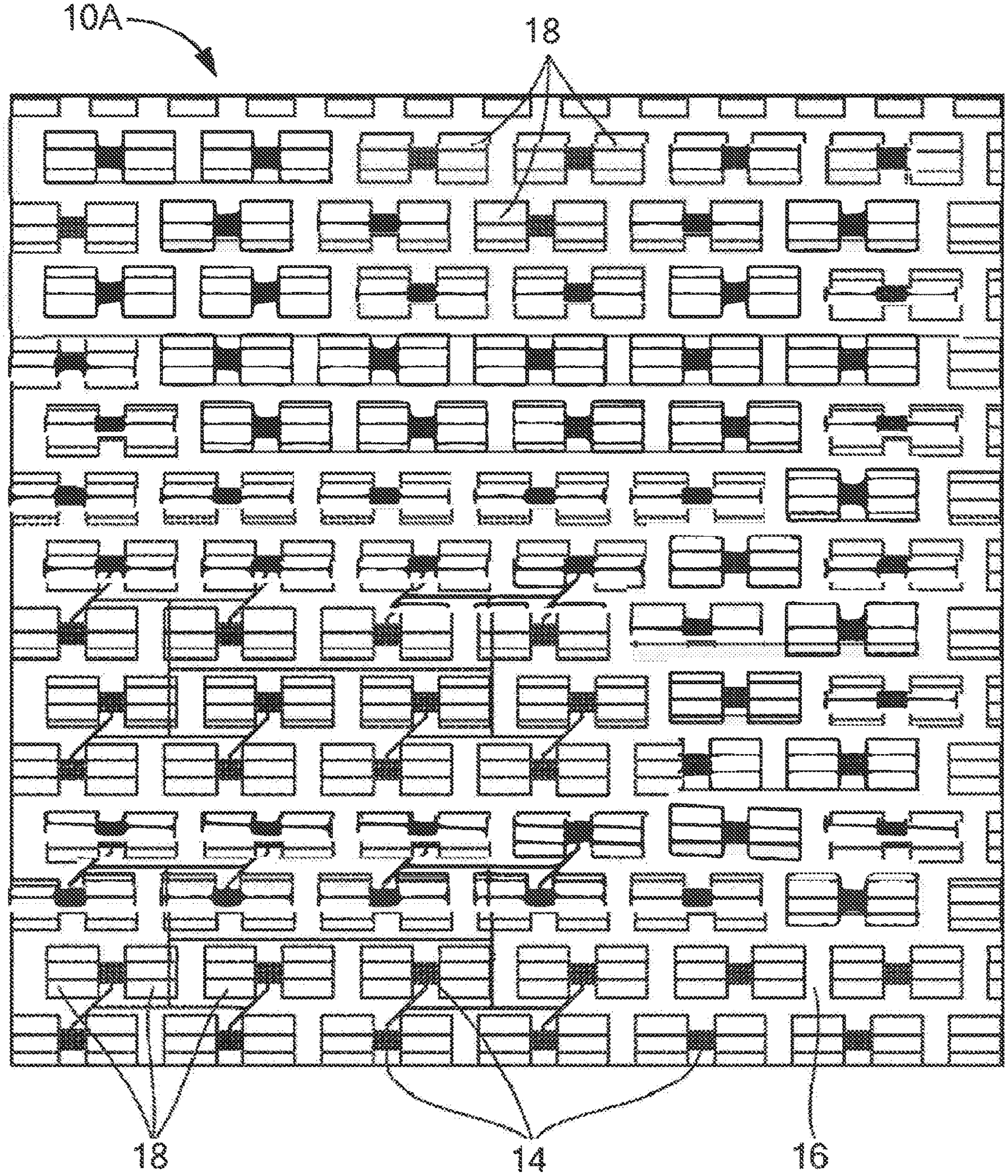
FIG. 3A schematically shows a plan view of a laminar printed circuit board portion of an AESA configured in accordance with illustrative embodiments.

FIG. 3A schematically shows a plan view of a primary portion of an AESA system 10 that may be configured in accordance with illustrative embodiments of the invention. In a similar manner, FIG. 3B schematically shows a close-up of a portion of the phased array 10A of FIG. 3A.

Specifically, the AESA system 10 of FIG. 3A is implemented as a laminar phased array 10A having a laminated printed circuit board 16 (i.e., acting as the substrate for routing signals and also identified by reference number "16") supporting the above noted plurality of elements 18 and integrated circuits 14. The elements 18 preferably are formed as a plurality of square or rectangular patch antennas oriented in a triangular patch array configuration. In other words, each element 18 forms a triangle with two other adjacent elements 18. When compared to a rectangular lattice configuration, this triangular lattice configuration requires fewer elements 18 (e.g., about 15 percent fewer in some implementations) for a given grating lobe free scan volume. Other embodiments, however, may use other lattice configurations, such as a pentagonal configuration or a hexagonal configuration. Moreover, despite requiring more elements 18, some embodiments may use a rectangular lattice configuration. Like other similar phased arrays, the printed circuit board 16 also may have a ground plane (not shown) that electrically and magnetically cooperates with the elements 18 to facilitate operation.

Figure 3B:
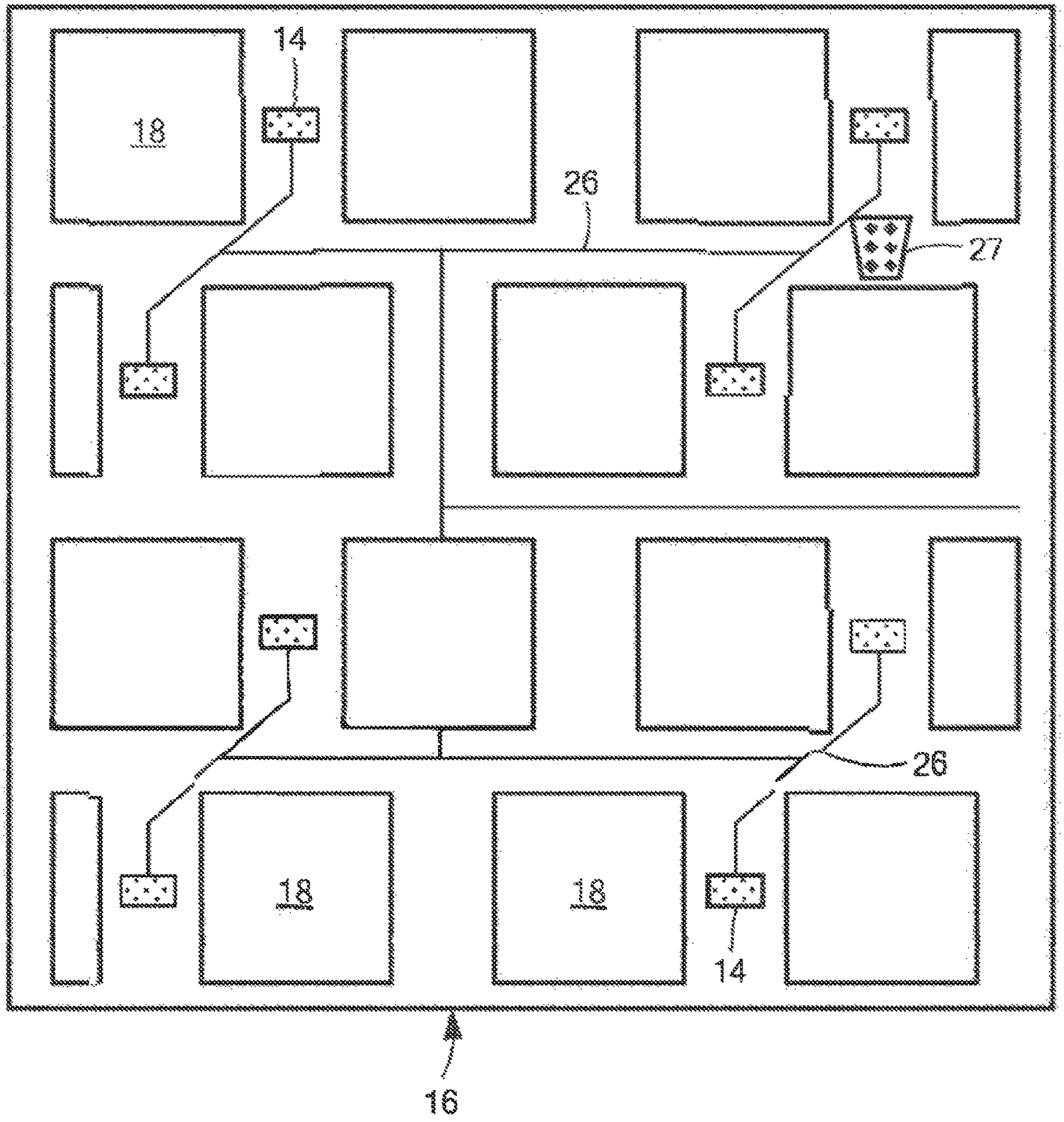
FIG. 3B schematically shows a close-up of a portion of the laminated printed circuit board of FIG. 3A.

Indeed, the array shown in FIGS. 3A and 3B is a small phased array 10A. Those skilled in the art can apply principles of illustrative embodiments to laminar phased arrays 10A with hundreds, or even thousands of elements 18 and integrated circuits 14. In a similar manner, those skilled in the art can apply various embodiments to smaller phased arrays 10A.

As a patch array, the elements 18 have a low profile. Specifically, as known by those skilled in the art, a patch antenna (i.e., the element 18 or the transmission/receiving part of the element) typically is mounted on a flat surface and includes a flat rectangular sheet of metal (known as the patch and noted above) mounted over a larger sheet of metal known as a "ground plane." A dielectric layer between the two metal regions electrically isolates the two sheets to prevent direct conduction. When energized, the patch and ground plane together produce a radiating electric field and/or receive RF signals.

As noted above and discussed in greater detail below, illustrative embodiments form the patch antennas on one or more printed circuit boards that themselves are coupled with the printed circuit board 16. These patch antennas preferably are formed using standard printed circuit board fabrication processes, thus complying with standard printed circuit board design rules (discussed below). Accordingly, using such fabrication processes, each element 18 in the phased array 10A should have a very low profile.

The phased array 10A can have one or more of any of a variety of different functional types of elements 18. For example, the phased array 10A can have transmit-only elements 18, receive-only elements 18, and/or dual mode receive and transmit elements 18 (referred to as "dual-mode elements 18"). The transmit-only elements 18 are configured to transmit outgoing signals (e.g., burst signals) only, while the receive-only elements 18 are configured to receive incoming signals only. In contrast, the dual-mode elements 18 are configured to either transmit outgoing burst signals, or receive incoming signals, depending on the mode of the phased array 10A at the time of the operation. Specifically, when using dual-mode elements 18, the phased array 10A can be in either a transmit mode, or a receive mode. The noted controller 24 at least in part controls the mode and operation of the phased array 10A, as well as other array functions.

The AESA system 10 has a plurality of the above noted integrated circuits 14 (mentioned above with regard to FIG. 2B) for controlling operation of the elements 18. Those skilled in the art often refer to these integrated circuits 14 as "beam steering integrated circuits," or "beam forming integrated circuits."

Each integrated circuit 14 preferably is configured with at least the minimum number of functions to accomplish the desired effect. Indeed, integrated circuits 14 for dual mode elements 18 are expected to have some different functionality than that of the integrated circuits 14 for the transmit-only elements 18 or receive-only elements 18. Accordingly, integrated circuits 14 for such non-dual-mode elements 18 typically have a smaller footprint than the integrated circuits 14 that control the dual-mode elements 18. Despite that, some or all types of integrated circuits 14 fabricated for the phased array 10A can be modified to have a smaller footprint.

As an example, depending on its role in the phased array 10A, each integrated circuit 14 may include some or all of the following functions:

phase shifting, amplitude controlling/beam weighting, switching between transmit mode and receive mode, output amplification to amplify output signals to the elements 18, input amplification for received RF signals (e.g., signals received from the satellite 12), and power combining/summing and splitting between elements 18.

Indeed, some embodiments of the integrated circuits 14 may have additional or different functionality, although illustrative embodiments are expected to operate satisfactorily with the above noted functions. Those skilled in the art can configure the integrated circuits 14 in any of a wide variety of manners to perform those functions. For example, the input amplification may be performed by a low noise amplifier, the phase shifting may use conventional active phase shifters, and the switching functionality may be implemented using conventional transistor-based switches.

Each integrated circuit 14 preferably operates on at least one element 18 in the array. For example, one integrated circuit 14 can operate on two or four different elements 18. Of course, those skilled in the art can adjust the number of elements 18 sharing an integrated circuit 14 based upon the application. For example, a single integrated circuit 14 can control two elements 18, three elements 18, five elements 18, six elements 18, seven elements 18, eight elements 18, etc., or some range of elements 18. Sharing the integrated circuits 14 between multiple elements 18 in this manner reduces the required total number of integrated circuits 14, correspondingly sometimes enabling a reduction in the required size of the printed circuit board 16.

As noted above, the dual-mode elements 18 may operate in a transmit mode, or a receive mode. To that end, the integrated circuits 14 may generate time division diplex or duplex waveforms so that a single aperture or phased array 10A can be used for both transmitting and receiving. In a similar manner, some embodiments may eliminate a commonly included transmit/receive switch in the side arms of the integrated circuit 14. Instead, such embodiments may duplex at the element 18. This process can be performed by isolating one of the elements 18 between transmit and receive by an orthogonal feed connection.

RF interconnect, through-vias, and/or beam forming lines 26 electrically connect the integrated circuits 14 to their respective elements 18. To further minimize the feed loss, illustrative embodiments mount the integrated circuits 14 as close to their respective elements 18 as possible. Specifically, this close proximity preferably reduces RF interconnect line lengths, reducing the feed loss. To that end, each integrated circuit 14 preferably is packaged either in a flip-chipped configuration using wafer level chip scale packaging (WLCSP), or a traditional package, such as quad flat no-leads package (QFN package). While other types of packaging may suffice, WLCSP techniques are preferred to minimize real estate on the substrate 16A. Some embodiments may mount some or all of the integrated circuits 14 on or within the printed circuit boards forming the elements 18. Other embodiments may mount some or all of the integrated circuits 14 on the underlying routing substrate board 16.

In addition to reducing feed loss, using WLCSP techniques reduces the overall footprint of the integrated circuits 14, enabling them to be mounted on the top face of the printed circuit board 16 with the elements 18—providing more surface area for the elements 18. Other embodiments mount the integrated circuits 14 of one side and the elements 18 on the other side.

It should be reiterated that although FIGS. 3A and 3B show the AESA system 10 with some specificity (e.g., the layout of the elements 18 and integrated circuits 14), those skilled in the art may apply illustrative embodiments to other implementations. For example, as noted above, each integrated circuit 14 can connect to more or fewer elements 18, or the lattice configuration can be different. Accordingly, discussion of the specific configuration of the AESA system 10 of FIG. 3A (and other figures) is for convenience only and not intended to limit all embodiments.

Each dual transmit/receive integrated circuit preferably has separate transmit and receive interfaces for each element it controls. For example, if a given integrated circuit controls two elements, it has a first pair of transmit and receive interfaces for the first element, and a second pair of transmit and receive interfaces for the second element. Each transmit interface and receive interface on an integrated circuit respectively couples to corresponding transmit and receive interfaces on one of the elements. To provide signal isolation, the two interfaces on each element are polarized out of phase with each other. For example, a given element's transmit interface may be about 90 degrees out of phase with its receive interface.

Figure 4:
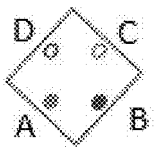
FIG. 4 schematically shows an example of an antenna/element with four polarization RF points in accordance with illustrative embodiments.

More specifically, as shown in FIG. 4, each element preferably is configured for radiation in two orthogonal polarization (referred to herein as P1 and P2) by two separate positive excitation points "A" and "B," respectively. The element has another excitation point on the different (opposite) edge called the "negative excitation point" corresponding to A and B, and referred as "C" and "D," respectively. Orthogonal polarization P1 is excited by A or C, whereas polarization P2 is excited by B or D, respectively.

In illustrative embodiments, the number of point A excited elements is substantially equal to the number of elements excited by point C; and the number of elements excited by point B are substantially equal to the number of element excited by point D. Accordingly, cross-polarization effectively is canceled by having equal number of positive and negative excitation of array elements; improving the cross-polarization of the entire array.

In general, illustrative embodiments relate to an antenna array where each antenna element can radiate energy into two perpendicular polarizations by coupling to two-points A and B with positive excitation, or C and D with negative phase excitation, but resulting in the same polarization. That is, polarization is the same when C (or D) is excited by a negative phase in comparison to phase at A (or B), but with same amplitude (FIG. 4).

Two pairs of antenna elements are connected together with a transmission line by connecting A-to-A and B-to-B of each antenna (called the positive pair) and by connecting C-to-C and D-to-D (called the negative pair), respectively. The connecting transmission line has a center location referred to as "AA/BB" for the positive pair and "CC/DD" for the negative pair. In general, AA, BB, CC, and DD are not collinear for a given antenna array arrangement. This arrangement, in general, is known in the art as a "split feed arrangement," where two elements are connected to the same RF source through a common excitation point, e.g., the correct phase of signal is connected at AA, BB, CC, and DD in FIG. 5.

Figure 5:
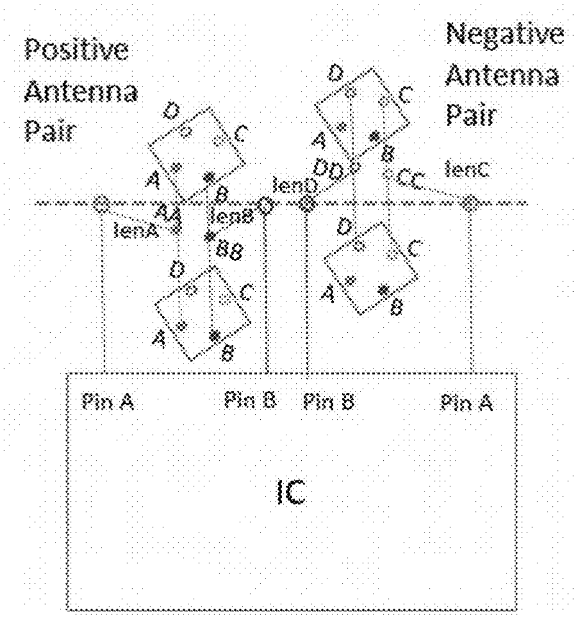
FIG. 5 schematically shows positive and negative antenna pairs and their interconnections to the beamforming IC in accordance with illustrative embodiments.

To physically align AA, BB, CC, and DD, segments of connecting line lenA, lenB, lenC, and lenD are added to AA, BB, CC, and DD (FIG. 5). These lines end in points that are collinear and preferably of equal distance from the IC. Unless the context suggests otherwise, the term "collinear" as used herein refers to the alignment of the four intersection end points of lenA, lenB, lenC, and lenD along the horizontal line (dash line in purple in FIG. 5), where the electrical center (AA, BB, CC, or DD) are linear and aligned with the IC outputs, making all connections electrically and physically symmetric. Maintaining equal length routing for these antennas enables the phased array to have equal phase and amplitude between different ICs and different antennas. The ends are then connected to an IC such that each polarization is symmetrically excited from the IC. Each negative excitation point is excited with negative phase. This approach is applicable to linear polarization of a wide variety of different orientations.

Figure 6:
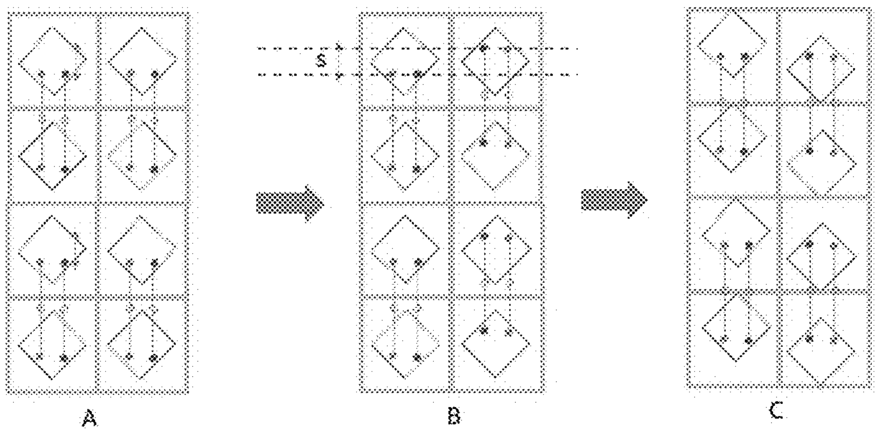
FIG. 6 schematically shows an example lattice and interconnect layout involving polarization reversal and column offset in accordance with an illustrative embodiment.
Figure 7:
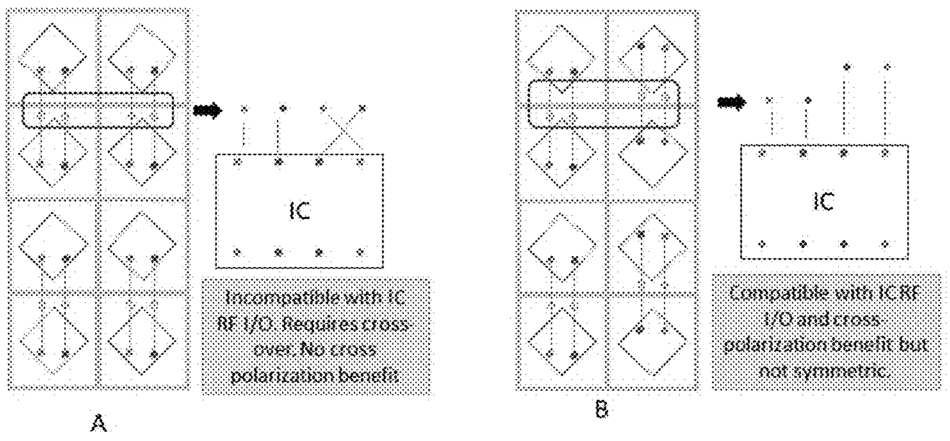
FIG. 7 schematically shows an example lattice and interconnect layout involving polarization reversal to eliminate interconnect cross-over in accordance with an illustrative embodiment.
Figure 8:
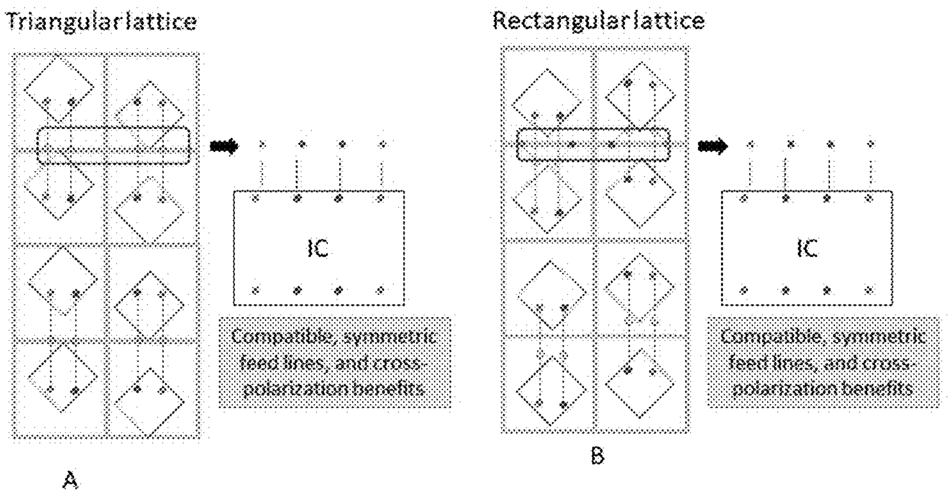
FIG. 8 schematically shows example lattice and interconnect layouts providing symmetric feed lines and cross-polarization benefits in accordance with illustrative embodiments.

Specifically, the embodiment shown in FIGS. 6-8 illustrates a working example of various embodiments. In FIG. 6, for example, diagram A shows a typical slant polarization (+/−45 degree of polarization orientation) split feed antenna configuration (2×4 array or sub-array). Diagram B shows how the second column of array A has its antenna polarizations reversed in phase as desired by low cross polarization level specifications. By doing this, the feed network between columns are offset from each other horizontally. Diagram C shows how the antenna elements (i.e., the antennas or the patches) are offset by the same distance (each column moves by s/2 in vertical direction toward each other) and re-align the split feed-sum junctions (colorless circles in FIG. 6). Consequently, the alignment of the feed points matches with the topology of the IC feed points (in this example, relative to the IC feed points of a quad beamformer IC) as shown in FIG. 7. Specifically, FIG. 7 shows an antenna array or sub-array of 2×4 supporting and connected to one beamformer IC via eight RF pins (four for each polarization). Diagram A shows the array or sub-array with all elements oriented the same way, which requires cross-over and does not provide cross-polarization benefits. Diagram B shows the array or sub-array with the antenna polarizations of the second column reversed in phase, which eliminates the need for cross-over and provides a cross-polarization benefit but is not symmetric, as the feedlines from the beamforming IC to the left-column elements are different lengths than the feedlines from the beamforming IC to the right-column elements.

Therefore, as shown in FIG. 8, the antenna array can achieve simultaneously phase reversal of the polarizations (from column to column in the array) and routing symmetry (electrically and physically) and if desired a triangular lattice for the array. In Diagram A, the elements are offset vertically as in the arrangement shown in Diagram C of FIG. 6 such that the feedlines from the beamforming IC are symmetric. In Diagram B, a short routing length (equivalent to lenA, lenB, lenC, lenD in the general description above) can be added to each split feed-sum junction to re-align the routing junctions to a horizontal line, e.g., if rectangular lattice is desired. This is configured in a manner for maintaining the electrical and physical symmetry to the routing from the antenna elements (the patches) to the IC RF pins.

Figure 9:
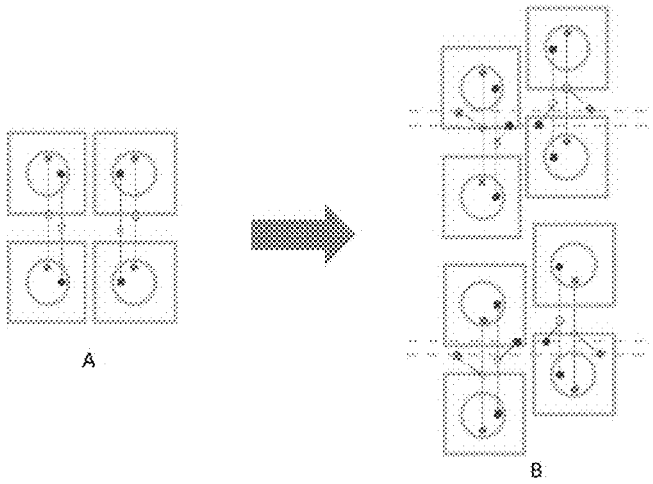
FIG. 9 schematically shows an example lattice and interconnect demonstrating a linear polarization of horizontal/vertical pair in accordance with illustrative embodiments.

FIG. 9 shows another embodiment demonstrating a linear polarization of horizontal/vertical pairs. In this example, the feed point locations and phase reversal of the split feed antenna array is already aligned to the IC RF pins in the rectangular lattice (Diagram A). This array can be transformed into a triangular lattice (Diagram B) using the extra trace (equivalent to lenA, lenB, lenC, and lenD above), while maintaining symmetry of the electrical and physical routing. Accordingly, illustrative embodiments provide a means to transform any antenna array of linear polarization into a symmetrical rectangular or triangular lattice, while maintaining electrical and physical routing between the antenna elements (e.g., the patches) and the IC RF pins.

Figure 10:
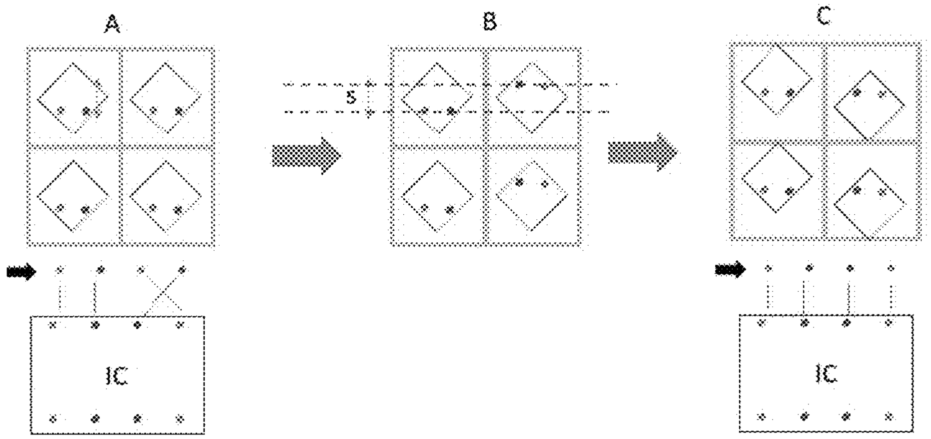
FIG. 10 schematically shows an embodiment implementing a slant polarization antenna array.

FIG. 10 shows another embodiment of the invention implementing a slant polarization antenna array, or sub-array of 2×2. Each polarization in each antenna in this configuration is directly connected to an RF pin of the IC, hence referred to as "direct feed array" architecture. Those skilled in the art would understand that the approach outlined above for the split feed architecture also applies to this direct feed arrangement. FIG. 10 demonstrates phase reversal (from diagram A to diagram B) and element offset re-alignment (from diagram B to diagram C) of the antenna feeds to the IC RF pins in a triangular lattice, while maintaining symmetry in electrical and physical routing.

Thus, for example, to achieve IC routing symmetry, scan performance, and cross polarization level (including non-linear polarization) all at once, the asymmetry property in a phase reversal arrangement can be neutralized by the asymmetry in the triangular lattice (e.g., a quasi-triangular lattice that is a lattice based on a regular triangle but not an isosceles triangle). The antenna columns or rows can be shifted vertically and/or horizontally, respectively, by a length that can align the phase reversed feed locations of the same polarization to the same horizontal or vertical line, respectively. In this way, optimal IC routing can be enabled on the RF output routing to the antennas and the optimal input routing of the IC can be enabled in a rectangular lattice, while antenna lattice can be non-rectangular, e.g., triangular like. In one embodiment of a slant polarization split feed element, this alignment can be done by shifting the elements by half of "s," e.g., as shown in FIG. 6, where "s" is the distance between the antenna feed locations of two adjacent phase reversed elements. In another embodiment of a H/V polarization split element, this alignment can be achieved using the RF trace of the sum legs in the split element sum circuit to equalize the separation between the antenna feed locations of two adjacent phase reversed elements, e.g., as shown in FIG. 9.

The embodiments of the invention described above are intended to be merely exemplary; numerous variations and modifications will be apparent to those skilled in the art. Such variations and modifications are intended to be within the scope of the present invention as defined by any of the appended innovations.

What is claimed is:

1. A phased array system comprising:

a substrate;

a plurality of dual-mode receive and transmit elements configured in a triangular lattice on the substrate, wherein the plurality of dual-mode receive and transmit elements are arranged in a slant polarization split feed configuration;

a beamforming integrated circuit (IC) on the substrate, the beamforming IC comprising a first set of dual-mode receive and transmit element interfaces configured to be polarized in a first polarization and a second set of dual-mode receive and transmit element interfaces configured to be polarized in a second polarization different than the first polarization; and a plurality of feedlines electrically coupling the plurality of dual-mode receive and transmit elements with the beamforming IC, wherein the plurality of dual-mode receive and transmit elements comprise a first element and a second element that is adjacent to the first element, each of the first and second elements comprising a positive polarization interface and a negative polarization interface, and wherein the first element and the second element are offset by a physical distance such that the positive and negative polarization interfaces of the first element and the second element are collinear.

2. The phased array system of claim 1, wherein the feedlines each have a substantially same length.

3. The phased array system of claim 1, wherein the first polarization is orthogonal to the second polarization.

4. The phased array system of claim 1, wherein a first dual-mode receive and transmit element has first and second locations for receiving two feedlines of the plurality of feedlines, further wherein a second dual-mode receive and transmit element has third and fourth locations for receiving two feedlines of the plurality of feedlines, the first and third locations are configured for the first polarization, the second and fourth locations are configured for the second polarization.

5. The phased array system of claim 1, wherein the dual-mode receive and transmit elements are patch antenna elements.

6. The phased array system of claim 1, wherein the beamforming IC is further configured to generate a time division duplex waveform.

7. The phased array system of claim 6, wherein the time division duplex waveform is generated by isolating one of the plurality of dual-mode receive and transmit elements between transmit and receive using an orthogonal feed connection.

8. A phased array system comprising:

a substrate;

a plurality of dual-mode receive and transmit elements configured in a triangular lattice on the substrate, wherein the plurality of dual-mode receive and transmit elements are arranged in a slant polarization split feed configuration;

an integrated circuit (IC) on the substrate, wherein the IC comprises a first set of element interfaces configured to be polarized in a first polarization and a second set of element interfaces configured to be polarized in a second polarization different than the first polarization; and a plurality of feedlines electrically coupling the plurality of dual-mode receive and transmit elements with the first set of element interfaces and the second set of element interfaces, wherein the plurality of dual-mode receive and transmit elements comprise a first element and a second element that is adjacent to the first element, each of the first and second elements comprising a positive polarization interface and a negative polarization interface, and wherein the first element and the second element are offset by a physical distance such that the positive and negative polarization interfaces of the first element and the second element are collinear.

9. The phased array system of claim 8, wherein the substrate is a printed circuit board.

10. The phased array system of claim 8, wherein each of the plurality of dual-mode receive and transmit elements is a patch antenna element formed on the substrate.

11. The phased array system of claim 8, wherein the IC is surface mounted onto the substrate.

12. The phased array system of claim 8, wherein each of the plurality of feedlines have a length that is substantially the same.

13. The phased array system of claim 8, wherein the first polarization is orthogonal to the second polarization.

14. The phased array system of claim 8, wherein a first dual-mode receive and transmit element of the plurality of dual-mode receive and transmit elements comprises first and second locations for receiving two feedlines of the plurality of feedlines, wherein a second dual-mode receive and transmit element of the plurality of dual-mode receive and transmit elements comprises third and fourth locations for receiving two feedlines of the plurality of feedlines, wherein the first and third locations are configured for the first polarization, and wherein the second and fourth locations are configured for the second polarization.

15. The phased array system of claim 8, wherein the IC is further configured to generate a time division duplex waveform.

16. The phased array system of claim 15, wherein the time division duplex waveform is generated by isolating one of the plurality of dual-mode receive and transmit elements between transmit and receive using an orthogonal feed connection.

17. The phased array system of claim 1, wherein the plurality of dual-mode receive and transmit elements are arranged relative to the beamforming IC such that the plurality of feedlines are non-intersecting, symmetric feedlines that mitigate cross-polarization between the first polarization and the second polarization.

18. The phased array system of claim 8, wherein the plurality of dual-mode receive and transmit elements are arranged relative to the IC such that the plurality of feedlines are non-intersecting, symmetric feedlines that mitigate cross-polarization between the first polarization and the second polarization.

* * * * *